United States Patent
Geslin

(10) Patent No.: US 10,496,981 B2
(45) Date of Patent: Dec. 3, 2019

(54) MULTI-PROTOCOL COMMUNICATION CIRCUIT

(71) Applicant: NXP B.V., Eindhoven (NL)

(72) Inventor: Jeremy Geslin, Saint Aubin sur mer (FR)

(73) Assignee: NXP B.V., Eindhoven (NL)

( * ) Notice: Subject to any disclaimer, the term of this patent is extended or adjusted under 35 U.S.C. 154(b) by 1198 days.

(21) Appl. No.: 13/910,050

(22) Filed: Jun. 4, 2013

(65) Prior Publication Data

US 2013/0325711 A1     Dec. 5, 2013

(30) Foreign Application Priority Data

Jun. 5, 2012 (EP) .................................. 12290183

(51) Int. Cl.
    *G06Q 20/32*      (2012.01)
    *G06Q 20/22*      (2012.01)
    *G07G 1/01*      (2006.01)
    *G06Q 20/20*      (2012.01)
    *G07F 7/08*      (2006.01)

(52) U.S. Cl.
CPC ....... *G06Q 20/3278* (2013.01); *G06Q 20/204* (2013.01); *G06Q 20/223* (2013.01); *G07F 7/0873* (2013.01); *G07G 1/01* (2013.01)

(58) Field of Classification Search
CPC ............................................... G06Q 20/3278
USPC .......................................................... 705/41
See application file for complete search history.

(56) References Cited

U.S. PATENT DOCUMENTS

| | | | |
|---|---|---|---|
| 9,626,363 B2 * | 4/2017 | Rosenblatt | G06F 16/40 |
| 2007/0278290 A1 | 12/2007 | Messerges et al. | |
| 2008/0306849 A1 | 12/2008 | Johnson, Jr. et al. | |
| 2009/0191811 A1 | 7/2009 | Griffin et al. | |
| 2010/0082485 A1 * | 4/2010 | Lin | G06Q 20/12 |
| | | | 705/44 |

(Continued)

FOREIGN PATENT DOCUMENTS

| | | |
|---|---|---|
| GB | 2 457 257 A | 8/2009 |
| WO | 2009/071734 A1 | 6/2009 |

(Continued)

OTHER PUBLICATIONS

Kahn, Sufiyan; "A Review on Near Field Communication"; Nov. 4, 2010; International Journal of Advanced Research in Computer Science and Software Engineering; vol. 5, Issue 4, 2015 (Year: 2010).*

(Continued)

*Primary Examiner* — Ryan D Donlon
*Assistant Examiner* — Irene S Kang

(57) ABSTRACT

Peer-to-peer type communications are facilitated in a secure communication device. As consistent with one or more example embodiments, near-field communications are effected (150, 152) using a secure payment protocol conforming to a predefined certification standard for the secure payment protocol (100). Communication operability is transmitted (152) under the secure payment protocol and used to identify other protocols/applications under which communications can be effected. This information is used to effect P2P protocol communications (160), where applicable, and to do so while complying with the secure payment protocol.

18 Claims, 3 Drawing Sheets

(56) References Cited

U.S. PATENT DOCUMENTS

2012/0116965 A1* 5/2012 Coppinger ................... 705/41
2012/0143703 A1   6/2012 Wall et al.

FOREIGN PATENT DOCUMENTS

WO    WO-2009071734 A1 *  6/2009  ......... H04L 63/0492
WO        2011/065807 A1    6/2011

OTHER PUBLICATIONS

"EMV Contactless Mobile Payment—Application Activation User Interface—Version 1.0",EMVCo, 120 pgs, retrieved from the internet at: http://www.emvco.com/specifications.aspx?id=22 (Dec. 2010).
Extended European Search Report for Patent Appln. No. 12290183.8 (dated Oct. 26, 2012).

* cited by examiner

MULTI-PROTOCOL COMMUNICATION CIRCUIT

CROSS-REFERENCE TO RELATED APPLICATIONS

This application claims the priority under 35 U.S.C. § 119 of European patent application no. 12290183.8, filed on Jun. 5, 2012, the contents of which are incorporated by reference herein.

Aspects of various embodiments of the present invention are directed to communication circuits, and to communication circuits that operate in accordance with two or more protocols.

In various contactless communications, standardized protocols are implemented to ensure compatibility between different types of devices. Such communication may involve, for example, contactless communication between a terminal and a card or other interactive device. With this approach, various manufacturers can produce terminals that are compatible with a wide variety of interactive devices.

Many applications require the secure transmission of data. For example, in contactless payment applications in which proprietary information is communicated over a short range (e.g., less than a few feet), it is important to ensure that the proprietary information is maintained as such, and to prohibit unwanted access. Such unwanted access may, for example, result in an unsavory party illegally accessing funds. Many protocols are implemented to ensure such secure data transmission. However, many such protocols require quite restrictive requirements with regards to the way terminals communicate, such as for running a detection procedure. This can result in long and tedious certification procedures and limited applicability in service.

These and other matters have presented challenges to the implementation of contactless communications, for a variety of applications.

Various example embodiments are directed to communication circuits and their implementation, and to effecting peer-to-peer (P2P) protocol in connection with another secure type protocol.

According to an example embodiment, an apparatus includes a near-field communications interface module that communicates near-field signals directly with portable communication devices, and a communication module that facilitates both secure/restricted and P2P communications. Proprietary payment data is wirelessly communicated via near-field communications, using a secure payment protocol conforming to a predefined certification standard for the secure payment protocol. The communication module communicates with multitudes of portable communication devices via NFC communications via the communications interface module, using a detection procedure specified via the secure payment protocol. File control information identifies at least one payment application available at the portable communication device and, if available, a peer-to-peer (P2P) protocol under which the portable communication device communicates.

In response to identifying a P2P protocol via the detection procedure, the apparatus operates in a first mode in which P2P data is communicated between the apparatus and the portable communication device using the second protocol, to provide information for access by a user via a user interface at the portable communication device. Encrypted payment data is communicated, in a second mode, with the portable communication device operating the payment application. This communication is effected exclusively via the secure payment protocol while preventing P2P communications between the communication module and the portable communication device via the second protocol.

Certain embodiments are directed to a payment terminal, or circuit therein, that operates in accordance with the above. Other embodiments are directed to a portable device, or circuit therein, that operates in accordance with the above. Still other embodiments are directed to systems that operate in accordance with the above, and that may include one or more such payment terminals or other devices in communication therewith, and/or one or more such portable devices. Further, many embodiments are directed to related methods of communicating.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
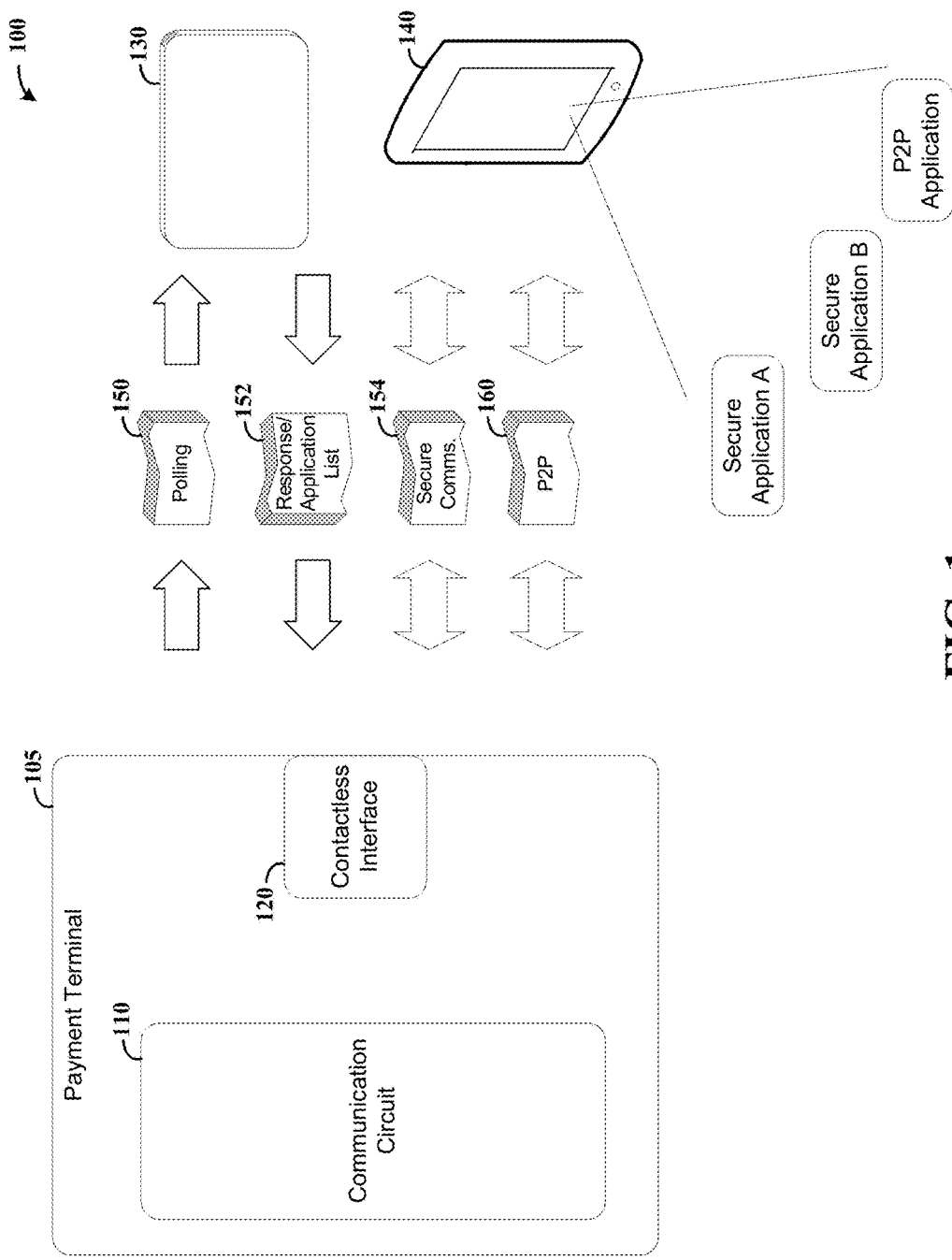
FIG. 1 shows apparatuses and a system, in accordance with one or more example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements involving communication circuits that operate using different protocols to facilitate secure and P2P data communication. While the present invention is not necessarily so limited, various aspects of the invention may be appreciated through a discussion of examples using this context.

Various example embodiments are directed to a near-field communications (NFC) approach involving a terminal and one or more mobile devices. Communications between the terminal and one of the mobile devices are effected according to a secure protocol (e.g., a payment protocol), which involves a discovery sequence in which capabilities of the mobile device are communicated with the terminal. As part of this discovery sequence, data identifying peer-to-peer (P2P) capabilities of the mobile device is also included with data delivered as part of the secure communications discovery sequence, for those devices having P2P capabilities. Using this approach, a single discovery sequence can be used to effect communications with mobile devices, or other devices such as payment cards, while also identifying P2P capabilities.

Once identifying a mobile device as having P2P capabilities, P2P communications between the terminal and the mobile device, such as for delivering media or other content, are effected while respecting the secure protocol. For example, if a P2P communication is initiated during operation of the secure protocol for communicating data between the mobile device and the terminal, the P2P communication is made such that is does not coincide with the secure protocol communications. In one embodiment, communications via the P2P protocol are delayed until after the secure protocol communications are complete. In another embodiment, the secure protocol communications are suspended for a time period, during which P2P communications are effected, with the secure protocol communications resuming after the P2P communications have concluded.

In accordance with these and other embodiments, terminals communicating using such a P2P discovery approach within another, different secure communication protocol permits the terminals to effect/operate certification functions within the bounds of the secure communication protocol. This facilitates implementation of the terminals that complies with such certification function requirements for the secure communication protocol. Further, this approach facilitates the discovery of P2P capabilities within an established discovery process, which permits implementation without necessarily implementing a separate P2P discovery approach.

In accordance with another example embodiment, an apparatus includes a wireless interface module that communicates data via near-field communications directly between a host terminal and a mobile device, and a communication module that operates as follows. Data is communicated via the wireless interface module, to identify protocols via which the mobile device can communicate. When the identified protocols include a P2P protocol, the communication module operates to communicate P2P data between the host terminal and the mobile device using the P2P protocol, such as for communicating information from the host terminal to the mobile device for access by a user (e.g., for viewing an image). Encrypted data is communicated via the wireless interface between the host terminal and the mobile device exclusively via a second secure protocol while preventing all other communications (including P2P communication) between the communication module and the local communication device, while communicating the encrypted data.

A more particular example embodiment involves communications in an environment in which proprietary payment data is wirelessly communicated via near-field communications, using a secure payment protocol conforming to a predefined certification standard for the secure payment protocol. In accordance with this environment, an apparatus includes a near-field interface module that communicates near-field signals directly with portable communication devices, and a communication module that operates as follows, for each portable communication device via which NFC communications are established via the interface module. A detection (e.g., discovery) procedure is implemented to communicate with the portable communication device, as specified via the secure payment protocol. As part of this procedure, file control information identifying payment applications available at the portable communication device is communicated from the mobile device to the payment terminal. If the portable communication device has P2P capabilities, the portable device includes information identifying the P2P capabilities with the file control information.

In response to detecting or otherwise ascertaining that the portable device is capable of operating using the P2P protocol via the detection procedure, the payment terminal operates in a first mode in which P2P data is communicated between the apparatus and the portable communication device using the P2P protocol. Such information may, for example, include information for access by a user via a user interface at the portable communication device, such as an advertisement or coupon relating to the payment terminal and/or the environment (e.g., retail establishment) in which the terminal is located.

The payment terminal also operates in a second mode, for communicating encrypted payment data with the portable communication device exclusively via the secure payment protocol. This communication may, for example, be implemented using one or more payment approaches as may be identified in the file control information obtained during the detection/discovery procedure. Such payment approaches may, for example, identify different payment sources, such as a particular credit card system/account, that a user at the portable device may wish to implement for completing the transaction. In many instances, the communication is carried out while also preventing P2P communications between the communication module and the portable communication device via the P2P protocol.

In accordance with a more particular example embodiment, a payment terminal detects peer-to-peer (P2P) support of the external devices as they are detected via local contactless communications, such as near-field communications (NFC), together with communication support for effecting secure payment. In one implementation, this approach is carried out using a selection procedure in which a list of applications/services is provided to the payment terminal. These applications/services may include, for example, services for different types of systems and entities for which secure communications are effected. When the list identifies P2P support, the payment terminal operates in a P2P communication mode, exclusively of a secure payment mode, and communicates data to the external device exhibiting P2P support. This communication may be implemented, for example, to communicate coupons, advertising or other information from the payment terminal to a user operating a hand-held device that is also capable of effecting payment. When payment is to be effected, the payment terminal operates using the secure payment mode during which P2P-type communications are not permitted. In some implementations, the terminal is responsive to detecting the support of P2P by aborting a current communication to proceed with P2P communications, or by finalizing a current communication before proceeding with P2P communications. Such P2P communications may, for example, be implemented using the NFCIP1 protocol.

The communication, payment and capability discovery approaches as discussed herein may be implemented using one or more of a variety of types of communications. For example, some embodiments are directed to EMVCo-type communications with mobile devices, in which the related implementation of a contactless payment terminal is not changed, and in which the certification process is also unchanged. A PPSE (Proximity Payment System Environment) functionality defined by the EMVCo standard is used by inserting specific information in the FCI (File Control Information) response to a select PPSE command (e.g., using an ISO7816 SELECT command over ISO14443-4), which identifies the P2P capabilities. Specifically, the mobile device operates a PPSE application in which the device responds with FCI (File Control Information), which contains a directory entry or list of directory entries identifying a product or products supported by the mobile device (e.g., contactless applications available for selection and use by the contactless payment terminal). In some implementations, the directory entry or list also includes a priority for each application (e.g., lower value is higher priority), a specific application underpinning the product (e.g., an application used to interact with the PPSE application on the Mobile Device), and other application-specific data.

For general information regarding communications, and for specific information regarding communication approaches, devices and systems that may be implemented in accordance with one or more example embodiments, reference may be made to the EMVCo Contactless Mobile Payment Application Activation User Interface (Overview, Usage Guidelines, and PPSE Requirements) document, Version 1.0, December 2010, which is fully incorporated herein by reference. For instance, the various communication methods, such as those involving polling procedures for discovering available applications (e.g., as for ISO14443 contactless cards), collision detection, data mapping and secure payment communications, can be implemented in connection with communications as discussed herein and/or with embodiments as described in the figures (e.g., with one or both of the terminal and hand-held device shown in FIG. 1).

The communications circuits herein may be implemented using one or more of a variety of types of contactless devices, such as tablets, media devices and mobile telephones, operating on a variety of operating systems. In addition, the circuits may be implemented using one or more of a variety of different types of chips/circuitry. One such example is the NXP NFC system on chip part number PN65N, available from NXP Semiconductors of Eindhoven, The Netherlands.

Turning now to the Figures, FIG. 1 shows apparatuses and a system 100, in accordance with one or more example embodiment of the present invention. The system 100 includes a payment terminal 105, which includes a communication circuit (module) 110 and an interface circuit (module) 120. The payment terminal 105 communicates with a variety of portable devices, such as mobile telephones, tablets, media devices and transaction cards. By way of example with the system 100, a payment card 130 and mobile device 140 are shown communicating with the payment terminal Various embodiments are directed to an apparatus implemented as the payment terminal 105. Other embodiments are directed to an apparatus implemented as the mobile device 140. Still other embodiments are directed to a system including both the payment terminal 105 and the mobile device 140 or an aspect thereof (e.g., a communication circuit module in the payment terminal 105 or the mobile device 140).

During a discovery phase, the communication circuit 110 communicates polling data 150 via the interface circuit 120. This polling data includes information that, when received by a mobile device or card such as card 130 and device 140, generates a response 152 including a list or other indication of operability of the card or device. Referring specifically to the device 140, when the device has P2P communication capabilities, the response 152 includes a list identifying the P2P capability to the payment terminal 105.

The communication circuit 110 uses the response data 152, as received via the interface circuit 120, to determine capabilities of the device with which the payment terminal 105 is communicating. Based on the response data 152, the communication circuit 110 then communicates with the card 130 or device 140 via secure communications 154 to effect payment-based data communication. Such communication may involve, for example, providing account identification information for a particular payment account that a user wishes to use, as may be identified via a user input and/or predefined user preference data, which may be stored locally in the mobile device 140. The payment terminal 105 uses the payment-based data communication to effect payment for a transaction, such as a point-of-sale transaction in the vicinity of the payment terminal).

When the response data 152 indicates that mobile device 140 is capable of communicating via P2P communications, the communication circuit 110 effects P2P communications 160 with the mobile device 140. Such communications may, for example, involve communicating advertising or coupon-based data that cause the mobile device 140 to display advertising or coupon-based images at a display on the mobile device.

The communications circuit 110 operates to ensure that the secure communications 154 involving the transfer of payment data are made in accordance with a secure communication protocol. This operation may involve, for example, prohibiting P2P communications (using a P2P protocol) while communicating via the secure communication protocol. As consistent with embodiments herein, P2P communications are delayed until secure communications 154 have concluded, and/or are carried out while secure communications 154 have been suspended and which are resumed after conclusion of the P2P communications.

Figure 2:
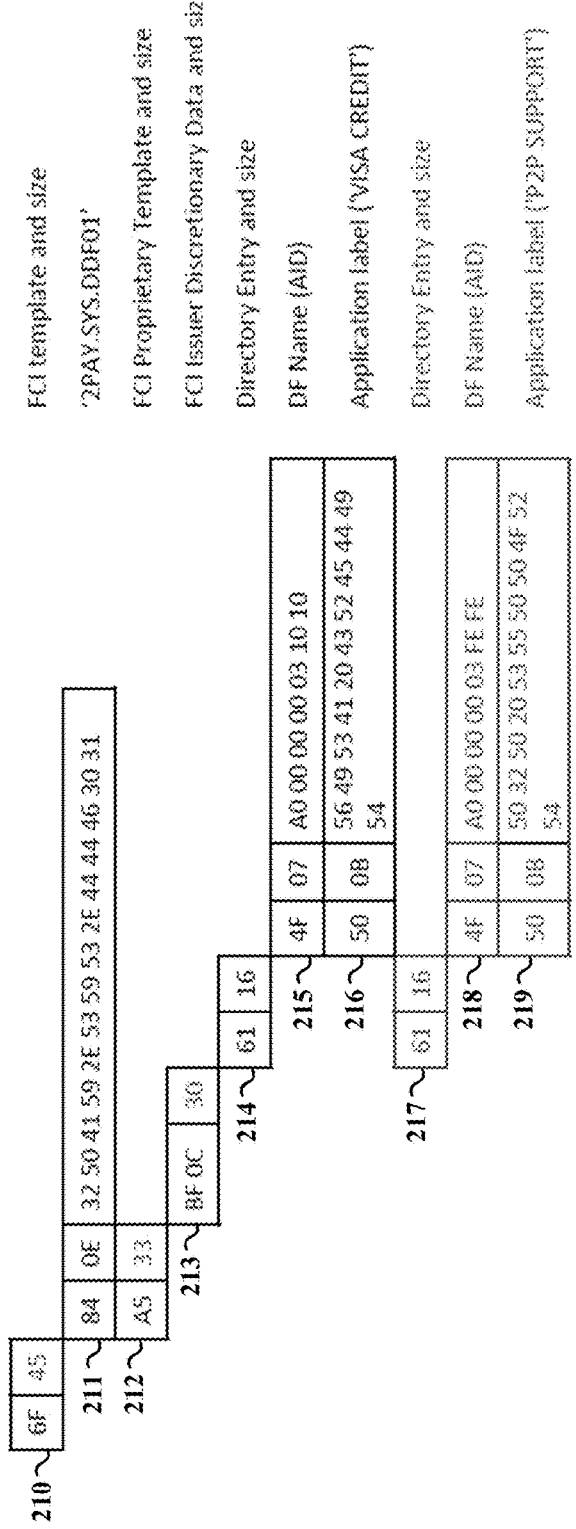
FIG. 2 shows an apparatus and approach for discovery of communications protocols, according to another example embodiment of the present invention.

FIG. 2 shows a data structure 200 for a communication approach involving the discovery of communications protocols for file control information (FCI), according to another example embodiment of the present invention. The data structure 200 includes respective rows 210-219. The left-most entry in row 210 specifies that the information is a file control template, and the next entry (45) is the size. Row 211 specifies payment information for the FCI, and rows 212 and 213 respectively identify (on the left) an FCI proprietary template and FCI issues discretionary data, and size (on the right). Row 215 identifies a directory with a dedicated name for indicating P2P communications capability, and row 216 identifies an application label (shown by way of example as "VISA credit"). Rows 217-219 include information for P2P communications, with row 217 showing a directory entry and size (as in 214), row 218 showing a name of the directory, and row 219 showing an application label with "P2P Support" shown by way of example.

The data structure in FIG. 2 can thus be implemented in accordance with protocol requirements for a payment-based protocol with restricted communications as discussed herein. The entries corresponding to P2P facilitate the inclusion of P2P functions with a discovery involved in proprietary payment schemes. When a reader device communicates with a mobile device communicating the FCI data, the reader device automatically determines that the device is capable of P2P communications and operates accordingly, such as in accordance with one or more example embodiments as discussed herein.

Figure 3:
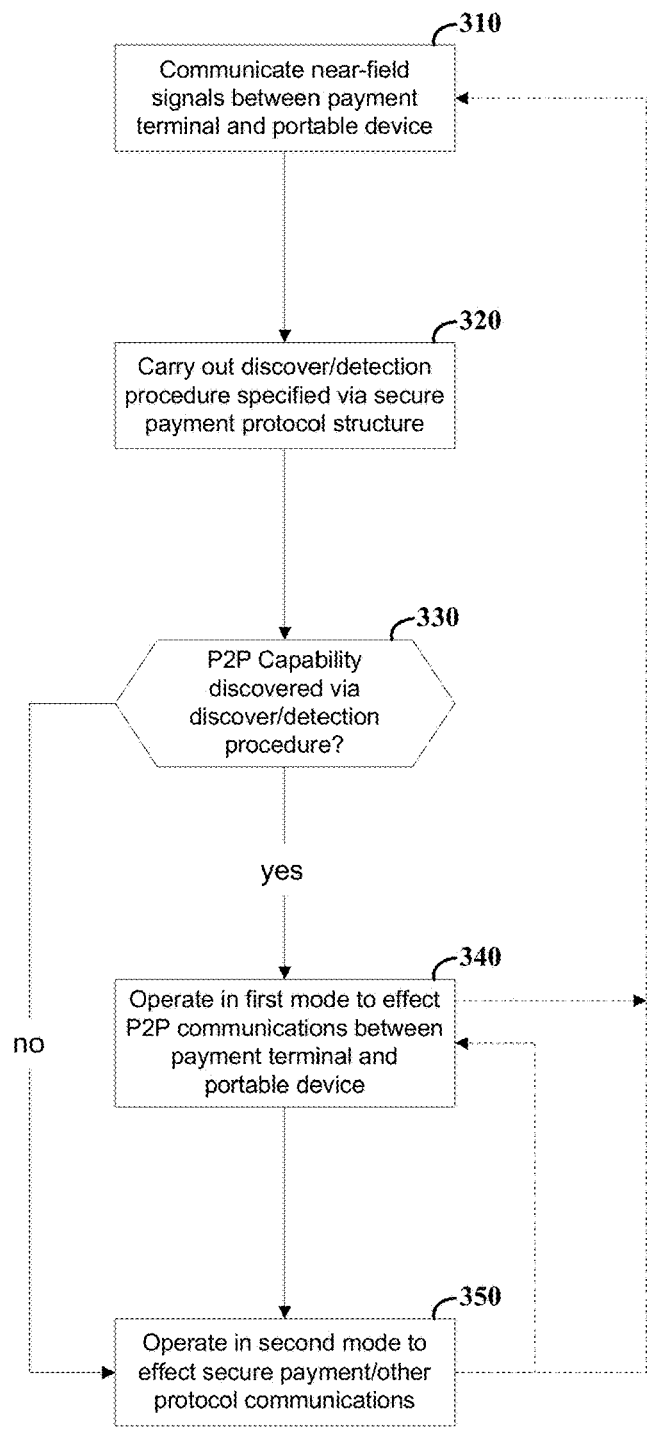
FIG. 3 shows a flow diagram for NFC communications, in accordance with another example embodiment of the present invention.

FIG. 3 shows a flow diagram for NFC communications, in accordance with another example embodiment of the present invention. At block 310, near-field signals are communicated between a payment terminal and a portable device, using a secure payment protocol conforming to a predefined certification standard for the secure payment protocol. At block 320, a discovery/detection procedure as specified via the secure payment protocol is carried out to communicate file control information identifying at least one payment application available at the portable communication device and, if available, a peer-to-peer (P2P) protocol under which the portable communication device communicates.

If P2P capability is identified via the discovery/detection procedure at block 330, first mode operation is carried out at block 340 in which P2P data is communicated between the apparatus and the portable communication device using the second protocol. This data provides information for access by a user via a user interface at the portable communication device. Operations in the second mode are carried out at block 350, to communicate encrypted payment data with the portable communication device operating the payment application, exclusively via the secure payment protocol and while preventing P2P communications between the communication module and the portable communication device via the second protocol.

In some implementations, operations in the second mode at block 350 are carried out prior to operations in the first mode at block 340. In various implementations, operation in one mode is interrupted or delayed pending operation in the other mode. For instance, in certain embodiments, operation in the first mode at block 340 are interrupted in response to communications under the secure payment protocol, based on which operation in the second mode at block 350 are carried out and after which operations in the first mode at 340 are continued. In other embodiments, operation in the second mode at block 350 are interrupted in response to detecting P2P communications, and resumed after P2P communications are complete. Similarly, operation in either mode upon detection of communications therein is delayed in certain embodiments, if operation in the other one of the modes is ongoing, until termination of the ongoing mode.

As discussed above, various aspects of the present invention are directed to apparatuses and systems for use in communicating data in a P2P environment, using a secure/ restricted type of protocol for discovering P2P capabilities. In certain embodiments, respective modules are operated to carry out one or more of these aspects. These modules may communicate with one another, and may be part of a common circuit executing separate actions. Accordingly, various modules may be implemented to carry out one or more of the operations and activities described herein and/or shown in the figures. In these contexts, a "module" is a circuit that carries out one or more of these or related operations/activities (e.g., communicating under one or more protocols). For example, in certain of the above-discussed embodiments, one or more modules are discrete logic circuits or programmable logic circuits configured and arranged for implementing these operations/activities, as in the modules shown in the Figures (see, e.g., FIG. 1). In certain embodiments, programmable circuits or modules as discussed herein include one or more computer circuits programmed to execute a set (or sets) of instructions (and/or configuration data). The instructions (and/or configuration data) can be in the form of firmware or software stored in and accessible from a memory (circuit). In one example, respective modules include a combination of a CPU hardware-based circuit and a set of instructions in the form of firmware, where a first module includes a first CPU hardware circuit with one set of instructions and a second module includes a second CPU hardware circuit with another set of instructions. Other circuit-based applications, such as host devices and reader applications, may also be carried out using such modules or computer circuits.

Certain embodiments are directed to a computer program product (e.g., nonvolatile memory device), which includes a machine or computer-readable medium having stored thereon instructions which may be executed by a computer (or other electronic device) to perform these operations/ activities. Such a product may be implemented, for example, in an application-type environment operating on a user's mobile device, or in a payment terminal.

Based upon the above discussion and illustrations, those skilled in the art will readily recognize that various modifications and changes may be made to the present invention without strictly following the exemplary embodiments and applications illustrated and described herein. For example, different types of secure communication protocols can be implemented within a common device, and different types of devices can be used to effect the communications, in connection with one or more embodiments as described herein. Such modifications do not depart from the true spirit and scope of the present invention, including that set forth in the following claims.

What is claimed is:

1. For use in an environment in which proprietary payment data is wirelessly communicated via near-field communications, using a first protocol being a secure payment protocol conforming to a predefined certification standard for the secure payment protocol, an apparatus comprising:
   a first near-field communications interface circuit configured and arranged to communicate near-field signals directly with portable communication devices via near-field communications (NFC); and
   a second communication circuit configured and arranged to, for each portable communication device via which NFC are established via the first near-field communication interface circuit,
      communicate, wirelessly, with the portable communication device, using a detection procedure specified via the secure payment protocol, to communicate file control information identifying at least one payment application available at the portable communication device and a second protocol being a peer-to-peer (P2P) protocol under which the portable communication device communicates,
      in response to identifying the P2P protocol via the detection procedure, operate in a first mode in which P2P data is communicated between the apparatus and the portable communication device using the second protocol, which data provides information for access by a user via a user interface at the portable communication device,
      in response to data communicated from the portable communication device via the first protocol while communicating data via the second protocol, terminate communications using the second protocol, and communicate with the portable communication device via the first protocol, and
      operate in a second mode to communicate, wirelessly, encrypted payment data with the portable communication device operating the payment application, exclusively via the secure payment protocol while preventing P2P communications between the second communication circuit and the portable communication device via the second protocol.

2. The apparatus of claim 1, wherein the second communication circuit is configured and arranged to determine that the portable communication device operates using the second protocol by communicating with the portable communication device using the first protocol to retrieve, from the file control information, a list of operational platforms supported by the portable communication device, the list of platforms including data identifying that the portable communication device supports a second P2P protocol.

3. The apparatus of claim 1, wherein the second communication circuit is configured and arranged to determine that the portable communication device operates using the second protocol by communicating with the portable communication device using the first protocol to retrieve, from the file control information, a list identifying payment platforms supported by the portable communication device, the list also including data identifying that the portable communication device supports a second P2P protocol.

4. The apparatus of claim 1, wherein the second communication circuit operates in the first mode to facilitate two-way communication with the portable communication device according to the P2P protocol.

5. The apparatus of claim 4, in which at least one of the portable communication device and the apparatus controls operation of the other one of the portable communication device and the apparatus via the two-way communication.

6. The apparatus of claim 1, wherein the second communication circuit is configured and arranged to, in response to data communicated from the portable communication device via the first protocol while communicating data via the second protocol, delay responding to the portable communication device via the first protocol until the data communication via the second protocol has finished, and thereafter responding to the portable communication device via the first protocol.

7. The apparatus of claim 1, wherein the second communication circuit is configured and arranged to, in response to data communicated via a second P2P protocol from the portable communication device while communicating data via the first protocol, terminate communications using the first protocol, and communicate with the portable communication device via the second protocol.

8. The apparatus of claim 1, wherein the second communication circuit is configured and arranged to, in response to data communicated via a second P2P protocol from the portable communication device while communicating data via the first protocol, delay responding to the portable communication device via the second protocol until the data communication via the first protocol has finished, and thereafter responding to the portable communication device via the second protocol.

9. The apparatus of claim 1, wherein the second communication circuit is configured and arranged to communicate directly with the portable communication device via near-field communications.

10. The apparatus of claim 1, wherein the second communication circuit is configured and arranged to perform the detection procedure using the communicated file control information by identifying different applications for completing the transaction and different, and selecting the second protocol among the different applications for operating in the first mode and the second mode.

11. The apparatus of claim 10, wherein the second communication circuit is configured and arranged to, in response to secure data communicated via the P2P protocol from the portable communication device while communicating data via the first protocol, terminate communications using the first protocol, and communicate with the portable communication device via the second protocol.

12. The apparatus of claim 1, wherein the second communication circuit is configured and arranged to perform the detection procedure using the communicated file control information by:
communicating polling data to the portable communication device,
responsive to receiving the file control information in response to the polling data, determine capabilities of the portable communication device, the capabilities including communication operability of and different applications supported by the portable communication device; and
selecting the payment application among the different applications and selecting the second protocol for communicating the encrypted payment data.

13. For use in an environment in which proprietary payment data is wirelessly communicated via near-field communications, using a first protocol being a secure payment protocol conforming to a predefined certification standard for the secure payment protocol, a method comprising:
communicating near-field signals directly with portable communication devices using near-field communications (NFC); and
for each portable communication device via which NFC are established via a first circuit,
communicating, wirelessly, with the portable communication device, using a detection procedure specified via the secure payment protocol, to communicate file control information identifying at least one payment application available at the portable communication device and a second protocol being a peer-to-peer (P2P) protocol under which the portable communication device communicates,
in response to identifying the P2P protocol via the detection procedure, operating in a first mode in which P2P data is communicated between the apparatus and the portable communication device using the second protocol, which data provides information for access by a user via a user interface at the portable communication device,
terminating communications using the second protocol and communicating with the portable communication device via the first protocol, in response to detecting data communicated from the portable communication device via the first protocol while communicating data via the second protocol, and
operating in a second mode to communicate, wirelessly, encrypted payment data with the portable communication device operating the payment application, exclusively via the secure payment protocol while preventing P2P communications between the communication circuit and the portable communication device via the second protocol.

14. The method of claim 13, wherein communicating with the portable communication device, using a detection procedure specified via the secure payment protocol includes retrieving, from the file control information, a list of operational platforms supported by the portable communication device, the list of platforms including data identifying that the portable communication device supports a second P2P protocol.

15. The method of claim 13, wherein operating in the first mode includes facilitating two-way communication with the portable communication device according to the P2P protocol, in which at least one of the portable communication device and the apparatus controls operation of the other one of the portable communication device and the apparatus via the two-way communication.

16. The method of claim 13, further including, in response to data communicated from the portable communication device via the first protocol while communicating data via the second protocol, delaying responding to communications from the portable communication device via the first protocol, until data communication via the second protocol has finished, and thereafter responding to the portable communication device via the first protocol.

17. The method of claim 13, further including terminating communications using the first protocol and communicating with the portable communication device via the second protocol, in response to detecting data communicated from the portable communication device via the second protocol while communicating data via the first protocol.

18. The method of claim 13, further including, in response to data communicated from the portable communication device via the second protocol while communicating data via the first protocol, delaying responding to communications from the portable communication device via the second protocol, until data communication via the first protocol has finished, and thereafter responding to the portable communication device via the second protocol.

* * * * *